United States Patent [19]

Reece

[11] 4,329,793
[45] May 18, 1982

[54] SOIL MOVING DEVICE

[75] Inventor: Alan R. Reece, Fawdon, England

[73] Assignee: The British Petroleum Company Limited, London, England

[21] Appl. No.: 90,124

[22] Filed: Nov. 1, 1979

[51] Int. Cl.³ .............................. F16L 1/04; E02F 5/18
[52] U.S. Cl. ............................................ 37/98; 37/54;
37/193; 405/161
[58] Field of Search ...................... 37/98, 193, 54;
405/159, 164, 165, 180, 161; 172/23, 26.5, 26.6

[56] References Cited

U.S. PATENT DOCUMENTS

| | | | |
|---|---|---|---|
| 2,144,063 | 1/1939 | Irvin | 405/161 |
| 2,669,040 | 2/1954 | Gregerson | 37/98 |
| 2,795,111 | 6/1957 | Richardson | 405/161 |
| 2,875,585 | 3/1959 | Little | 405/161 |
| 3,024,851 | 3/1962 | Harres | 37/193 X |
| 3,431,741 | 3/1969 | Kinnan | 405/180 |
| 3,478,527 | 11/1969 | Sherrod | 405/164 |
| 3,486,344 | 12/1969 | Ylinen | 405/180 |
| 3,905,200 | 9/1974 | Ylinen | 405/180 X |
| 4,011,727 | 3/1977 | Suzuki et al. | 37/54 X |

FOREIGN PATENT DOCUMENTS

| | | |
|---|---|---|
| 1185238 | 2/1959 | France . |
| 96443 | 12/1960 | Netherlands . |
| 1228373 | 4/1971 | United Kingdom . |
| 1349515 | 4/1974 | United Kingdom . |
| 1384078 | 2/1975 | United Kingdom . |

Primary Examiner—Clifford D. Crowder
Attorney, Agent, or Firm—Morgan, Finnegan, Pine, Foley & Lee

[57] ABSTRACT

A trenching implement (41) suitable for towing on the sea bed to make a trench for a submarine cable or pipeline (54) comprises a body (44) attached to which is a soil cutting member (46) which makes a soil surface in the direction of travel of the implement, a landside (45) engaging the soil surface and a towing means (56) connected so that, when the direction of travel is different from the line of the towing force (56), the line of the towing force (56), projected if necessary, passes through a point (50) in the region of the landside (45) with the result that the landside (45) resists the sideways component of the towing force (56). This reduces the risk of damage to the cable or pipeline (54).

4 Claims, 6 Drawing Figures

SOIL MOVING DEVICE

This invention relates to a soil moving implement which is suitable for towing, more particularly to a soil moving implement for making a trench at an underwater site for burying a submarine pipeline or cable hereafter referred to as a trenching plow.

Trenching plows which have been previously proposed for pipeline burial have usually been towed by a surface vessel and obtained their steering from the surface vessel and for this it is necessary to know accurately the position of both the pipeline or cable and the plow and then to calculate the required course. Even when this is done the line of action of the towing force may sometime deviate significantly from the axis of the pipeline with the risk of damage thereto.

It is an object of the present invention to reduce this risk by providing an implement in which the sideways component of the towing force is resisted thereby reducing the sideways force on the pipeline.

According to the present invention a soil moving implement which is suitable for towing comprises:
  (a) a body having attached thereto a soil cutting member, which in use forms a soil surface in the direction of travel of the implement,
  (b) a member which engages the soil surface, herein referred to as a landside,
  (c) steering means to enable the implement to travel in a direction different from the line of the towing force, and
  (d) a towing means connected to a point referred to herein as the hitch point so that in use the line of the towing force passes through a point in the region of the landside so that when the direction of travel of the implement is different from the line of the towing force the sideways component of the towing force is resisted by the landside. The towing means can conveniently be a cable or rod or other link.

The soil cutting member and the landside can be formed in one piece. For example, a soil cutting blade may be provided whose edge constitutes the soil cutting member and whose sides constitute the landside. Alternatively, the landside can be separate from the soil cutting member.

The point through which the towing force passes can be in the region of the effective centre of the landside. The term "effective centre" is well known to agricultural engineers and is the point on the landside through which the resultant soil force acts.

As stated above the line of the towing force passes through a point in the region of the landside when the direction of travel is different from the line of the towing force. This can be achieved by the hitch point being located in the region of the landside or the hitch point being located forward with respect to the landside so that in use the projected line of the towing force passes through the point in the region of the landside.

The effect of this is that the sideways component of the towing force is resisted by the landside thereby enabling the implement to be steered with a smaller steering force. In a typical prior art trenching plow arrangement the hitch point is located forward with respect to the landside, at or near the front of the implement, with the effect that when the direction of travel is different from the line of the towing force, there is a significant sideways force on the implement.

The implement can only resist this sideways force by exerting a similar force on the pipeline by means of guide arms or like means by which it is constrained to the pipeline.

The landside is conveniently at, or near the rear of the implement and consequently according to the invention the towing force (projected if necessary) will pass through the rear portion of the implement when the direction of travel is different from the line of the towing force.

The hitch point can be located over the landside (not necessarily directly above in a vertical sense, see FIGS. 2 and 4) or the point through which the projected line of the towing force passes can be over the landside (see FIG. 6). In most cases the point in the region of the landside will be located at a position along the length of the implement where the landside extends and rearward of the soil cutting member.

The hitch point can be movable on a laterally extending arm, the arm being so disposed so that the point moves on the circumference of a circle whose centre is at the point in the region of the landside.

The point in the region of the landside through which the line of the towing force passes can be located so that the components of the towing force and the soil cutting force perpendicular to the direction of travel create no significant couple in the horizontal plane.

The soil moving implement can be used for making a trench for a pipeline at an underwater site and can have in the region of the front thereof a carriage adapted to run on the pipeline so that at least a portion of the weight of the implement is supported by the pipeline.

The implement can further have located forward with respect to the carriage, a support member capable of contacting the ground to reduce the risk of overloading an unsupported section of pipeline.

The support member can be movable between a ground contacting position and a raised position free of the ground and means can be provided for moving the support member from one position to the other.

References to "above", "forward", "sideways" and "rear" refer to the implement in its disposition for normal use.

The term sea bed includes the bottom of any body of water such as river, lake or ocean.

The term pipeline is intended to include flowlines. Although the trenching device according to the invention is intended primarily for use underwater it can nevertheless be used on land.

Reference to the line of towing force means the line of the towing force projected in the horizontal plane through the hitch point.

According to another aspect of the present invention a method of moving soil comprises towing a soil moving implement and steering the implement in a direction different from the line of action of the towing force and wherein the line of the towing force passes through a point vertically above a landside which tends to resist the sideways component of the towing force.

The soil moving device according to the present invention may be employed to make a trench parallel and close to a pipeline or cable which can be moved sideways into the trench at a later time. Alternatively, the trenching device can be employed to make the trench and place the pipeline or cable therein in one opration.

The trenching device is particularly suitable for use where the pipeline or cable has been previously installed on the sea bed although it is possible to use the trenching device to bury a pipeline or cable as it is laid from a surface vessel.

Although described with particular reference to making a trench for a pipeline or cable, the soil moving implement according to the invention may be used for other purposes, for example, for covering a pipeline or cable previously installed in a trench (see FIGS. 1 to 4), for collecting material from or under the sea bed, for example, obtaining samples of sea bed material or collecting manganese nodules.

The invention is illustrated by reference to the accompanying drawings in which.

Figure 1:
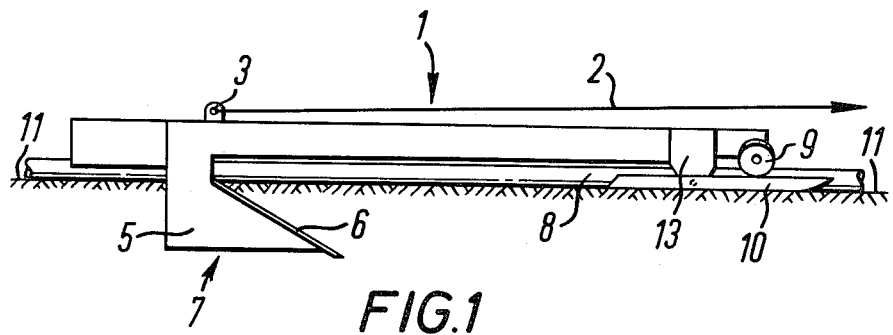
FIG. 1 is a side elevation of a soil moving implement in the form of a trenching plough showing the location of the hitch point.
Figure 2:
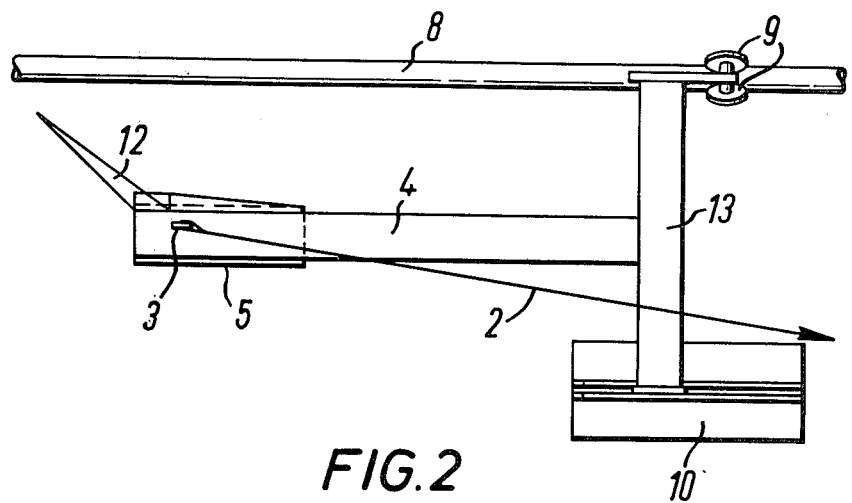
FIG. 2 is a plan view of the trenching plough shown in FIG. 1.

Referring to FIGS. 1 and 2 the trenching plough indicated generally by numeral 1 comprises a body in the form of beam 4 attached to the rear of which is a blade indicated generally by numeral 7, the leading face 6 of which is the soil cutting member and the sides 5 of which provide the landside. Located above the sides 5 is a hitch point in the form of a towing eye 3 to which a towing cable 2 is connected. The forward part of the beam 4 is attached to a laterally extending cross member 13 one end of which is attached to and supported by skid 10 on the sea bed 11. The trenching plough has steering means in the form of guide wheels 9 which straddle pipeline 8 and are attached to the other end of cross member 13 remote from skid 10. By means of the guide wheels 9 the trenching plough follows the pipeline 8 thus requiring no additional steering. The effect of the hitch point 3 located over the landside 5 is that the sideways component of the towing force is resisted with the result that the steering effect of the towing force is significantly reduced. In the disposition shown in FIGS. 1 and 2 the plough cuts a trench parallel to the pipeline 8 which has been previously installed in its trench. At the rear of the plough is a scraper 12 to displace spoil to cover the pipeline.

Figure 3:
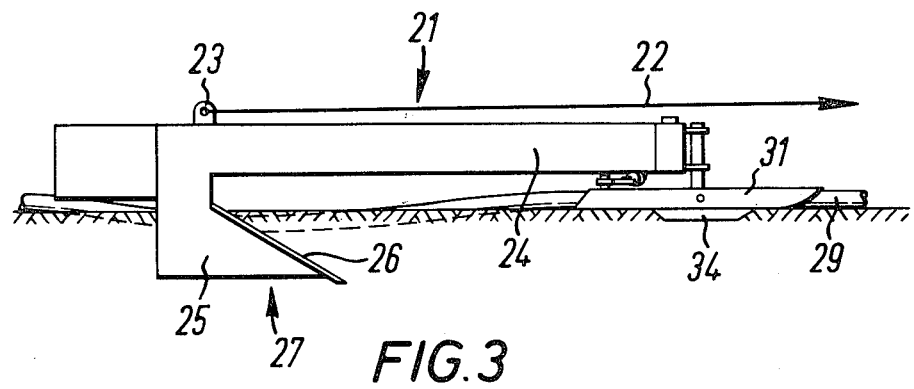
FIG. 3 is a side elevation of an alternative embodiment of the trenching plough in which steering is effected by means of a sensor which follows the pipeline and controls a servo mechanism and hydraulic ram.
Figure 4:
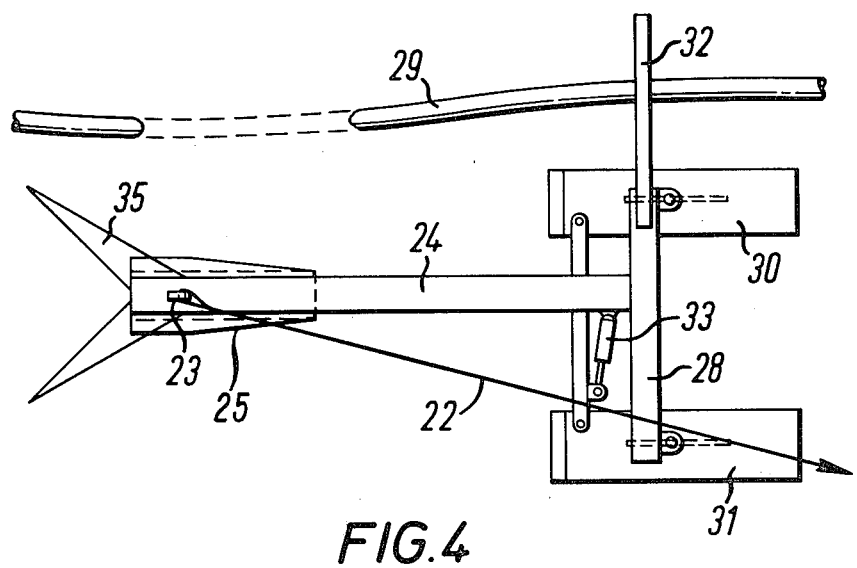
FIG. 4 is a plan view of the embodiment shown in FIG. 3.

Referring to FIGS. 3 and 4 the trenching plough indicated by reference numeral 21 is generally of similar construction to that shown in FIGS. 1 and 2 with the exception of the steering means. The plough comprises a body in the form of a beam 24 attached to the rear of which is a blade indicated generally by numeral 27 the leading face 26 of which is the soil cutting member and the sides 25 of which provide the landside. Located above the sides 25 is a hitch point in the form of towing eye 23 to which a towing cable 22 is attached. The forward part of the beam 24 is attached to a laterally extending cross member 28 the ends of which are attached to, and supported by, skids 30 and 31 on the sea bed. The plough has steering means in the form of sensor 32 which scans the pipeline 29 and controls a servo mechanism (not shown) which operates a hydraulic ram 33 which moves the skids 30 and 31 which have soil engaging blades (only one of which 34 is shown). By means of this arrangement the trenching plough is able to follow the pipeline 29 which may in places be buried as shown in FIG. 3 and produce a trench parallel to the axis of the pipeline. Attached to the rear of the body 24 are a pair of scraper arms 35 to move the spoil.

Figure 5:
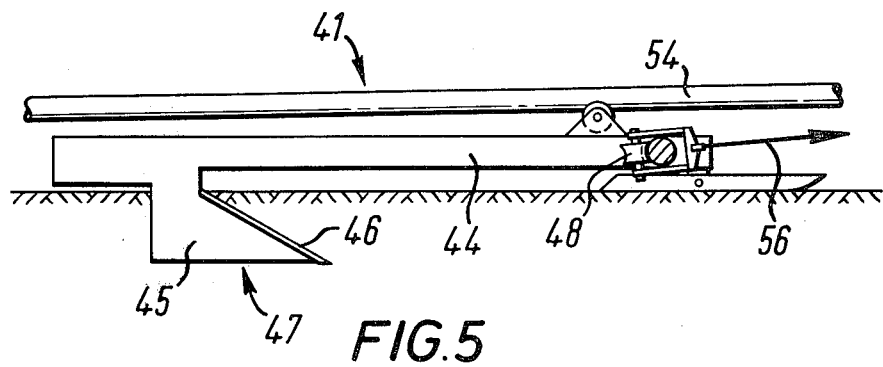
FIG. 5 is a side elevation of a further embodiment of the trenching plough in which the hitch point is located on a laterally extending arm.
Figure 6:
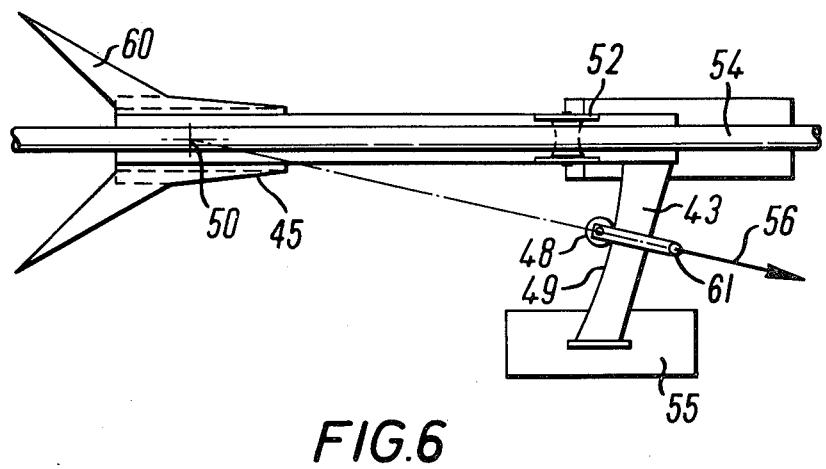
FIG. 6 is a plan view of the trenching plough shown in FIG. 5.

Referring to FIGS. 5 and 6 the trenching plough indicated generally by numeral 41 comprises a body in the form of beam 44 attached to the rear of which is a blade indicated generally by numeral 47, the leading face 46 of which is the soil cutting edge and the sides 45 of which provide the landside. In these respects the trenching plow is similar to the two embodiments previously described. The forward part of the beam 44 is attached to a laterally extending arm 43 the end of which is supported by skid 55. On the arm 43 is mounted a hitch point in the form of towing eye 61 which is movable on the arm 43 by means of roller 48. The arm 43 has a curved face 49 on which the roller 48 moves so that the hitch point 46 moves on the circumference of a circle whose centre is at point 50 which is over the landside 45. The effect of this is that the projected line of action of the towing force passes through point 50 with the result that the sideways component of the towing force is resisted by the landside 45.

The trenching plow has a steering means in the form of a pair of guide wheels 52 straddling the pipeline 54 the latter resting on a roller between the guide wheels 52. At the rear of the body is a pair of scrapers 60 for displacing soil sideways.

In use the trenching plow is towed by means of a line 56 attached to hitch point 46. The trenching plow passes along and under the pipeline 54. A trench is made into which the pipeline settles.

In the three embodiments shown the point through which the towing force passes, ie points 3, 23 and 50 are vertically above the effective centre of the landside in each case.

The present invention provides improved control of the trenching or other soil moving operation when the line of action of the towing force is up to 45° from the line of travel of the implement and particularly in the range up to 30°. Further the line of the towing force (when projected in the horizontal plane through the hitch point) passes through, or close to, a point on the vertical axis passing through the point of intersection of the lines of action of the soil forces on the cutting member and landside. Thus, any sideways force applied by the towing means is resisted by the landside to reduce the resultant couple in the horizontal plane. It is thus possible to steer the implement with a smaller steering force, with reduced risk of damage to the pipeline.

The embodiment in FIGS. 5 and 6 is particularly suitable for towing by an underwater tractor or other similar vehicle which cannot conveniently straddle the pipeline with the result that the towing force is always at an angle to the axis of the pipeline.

I claim:

1. A trenching plough which is suitable for underwater towing to form a trench for a previously laid underwater pipeline or cable which trenching plough comprises:
   (a) a body having attached thereto a soil cutting member, which soil cutting member in use forms a soil surface in the direction of travel of the plough,
   (b) a landside which engages the soil surface, (c) a steering apparatus which comprises means for engaging the previously laid cable or pipeline, said steering apparatus being spaced apart from, and forward, with respect to the landside, (d) a towing member pivotally connected to a hitch point on the plough whereby the direction of travel of the plough is within limits independent of the direction of the towing vehicle, the hitch point being located so that in use the line of the towing force passes through a point above the landside so that when the direction of travel of the plough is inclined to the line of the towing force, the sideways component of the towing force is resisted by the landside and the sideways forces on the pipeline or cable reduced.

2. A trenching plough as claimed in claim 1 wherein the steering apparatus is located at the front of the plough.

3. A trenching plough as claimed in claim 1 wherein the hitch point is located so that in use the projected line of the towing force passes through a point over the landside.

4. A trenching plough as claimed in claim 3, wherein the hitch point is moveable on a laterally extending arm, the arm being disposed so that the hitch point moves on the circumference of a circle whose center is at the point over the landside.

* * * * *